United States Patent [19]
Biagi et al.

[11] 3,870,993
[45] Mar. 11, 1975

[54] DISTANCE MEASURING EQUIPMENT FOR AIRCRAFT EMPLOYING PRECISION DISTANCE MEASURING MEANS

[75] Inventors: Alvaro D. Biagi, Huntington Station; Dimitri Luganski, Huntington, both of N.Y.

[73] Assignee: Republic Electronics Industries Corporation, Huntington Station, N.Y.

[22] Filed: May 21, 1973

[21] Appl. No.: 362,441

[52] U.S. Cl. ............................................. 343/6.5 R
[51] Int. Cl. ................................................ G01s 9/56
[58] Field of Search .................................. 343/6.5 R

[56] References Cited
UNITED STATES PATENTS
3,418,581 12/1968 Kennedy et al. ................. 343/6.5 R

*Primary Examiner*—T. H. Tubbesing
*Attorney, Agent, or Firm*—Edward H. Loveman

[57] ABSTRACT

A system for measuring the distance between an aircraft and a ground beacon station comprising a generator of interrogation pulses for transmission to the beacon station; and a receiver for receiving reply pulses from the beacon station, and for converting the received pulses into data representative of the distance between the aircraft and beacon station. The apparatus further includes high precision distance measuring apparatus comprising a modulator means for imposing notches on the interrogation pulses; means for receiving a special reply pulse from the beacon station; and computer means for generating data representative of the elapsed time between the first pulse notch and reception of the special reply pulse.

11 Claims, 5 Drawing Figures

DISTANCE MEASURING EQUIPMENT FOR AIRCRAFT EMPLOYING PRECISION DISTANCE MEASURING MEANS

This invention relates to a distance measuring system for aircraft and more specifically relates to a conventional Tacan Navigation system having means for more precisely measuring the distance of an aircraft from a ground receiving-transmitting beacon than has heretofore been possible.

It has been conventional heretofore to measure from an aircraft the distance of the aircraft from a ground beacon by transmitting an interrogation signal from the aircraft to the beacon and sending a reply signal from the beacon to the aircraft. The time elapsing between transmission of the interrogation signal and reception of the reply signal at the aircraft is taken as a measure of the instantaneous range or distance. In particular the most widely used system of this type employs apparatus generally known as the TACAN Navigation set AN-/ARN-52 which is an airborne, long-range distance measuring apparatus capable of providing a continuous indication of the line-of-sight distance of the aircraft carrying it from any selected ground station surface beacon or from another cooperating aircarft carrying compatible beacon equipment. The best short range accuracy obtainable with this type of a system has been about ± 600 feet, where the distance has been less than 10 miles.

The need has long existed for short range distance measuring equipment (DME) for aircraft which will provide distance measurements on the aircraft with an accuracy of less than 100 feet at distances of 3 miles or less from the beacon. Prior equipment proposals heretofore made have been objectionable due to high installation cost, complexity, large size, excessive weight, etc. The present invention provides means for realizing the long sought precision in distance measurements, and avoids the objections, difficulties and disadvantages of prior proposed systems.

According to the invention, the existing Tacan Navigation Set and the existing Tacan beacon equipment are retained. Precision distance measuring components are added to both the interrogating airborne equipment and replying beacon equipment. The components added to the airborne equipment are very light in weight, small in size and relatively inexpensive. These components together with the components added to the replying beacon operate with and use the existing Tacan interrogation and reply components. Precision short range distance measurement can now be made with an accuracy of approximately 90 feet.

The airborne Tacan equipment as is known emits a train of interrogation pulses of the Gaussian type. The responding beacon equipment replies with a train of similar pulse pairs. The present invention operates by imposing a notch on the first pulse of each pair of interrogation pulses in a wavetrain produced by the airborne equipment. This is zero range reference time. The beacon equipment receiving the interrogation signals recognizes the notch and replies with a fast rise time pulse within the interval of the first pulse of the received interrogation and also replies to the interrogation pulses in the normal manner at a later time. The replying pulses are received at the aircraft and processed by the precision distance measuring equipment which measures the time interval between occurence of a transmitted notch and receipt of replying fast rise time pulse. The present invention employs the transmitter of the existing Tacan equipment, and also utilizes its RANGE output for range gating, and its FLAG signal output which indicates acquisition of a return signal from the beacon equipment.

It is therefore a principal object of the present invention to provide an airborne distance measuring equipment which has an accuracy of approximately 90 feet.

It is another object of the present invention to provide a precision distance measuring equipment which utilizes existing Tacan equipment without impairing its normal function.

These and other objects and many of the attendant advantages of this invention will be readily appreciated as the same becomes better understood by reference to the following detailed description when considered in connection with the accompanying drawings in which.

Figure 1:
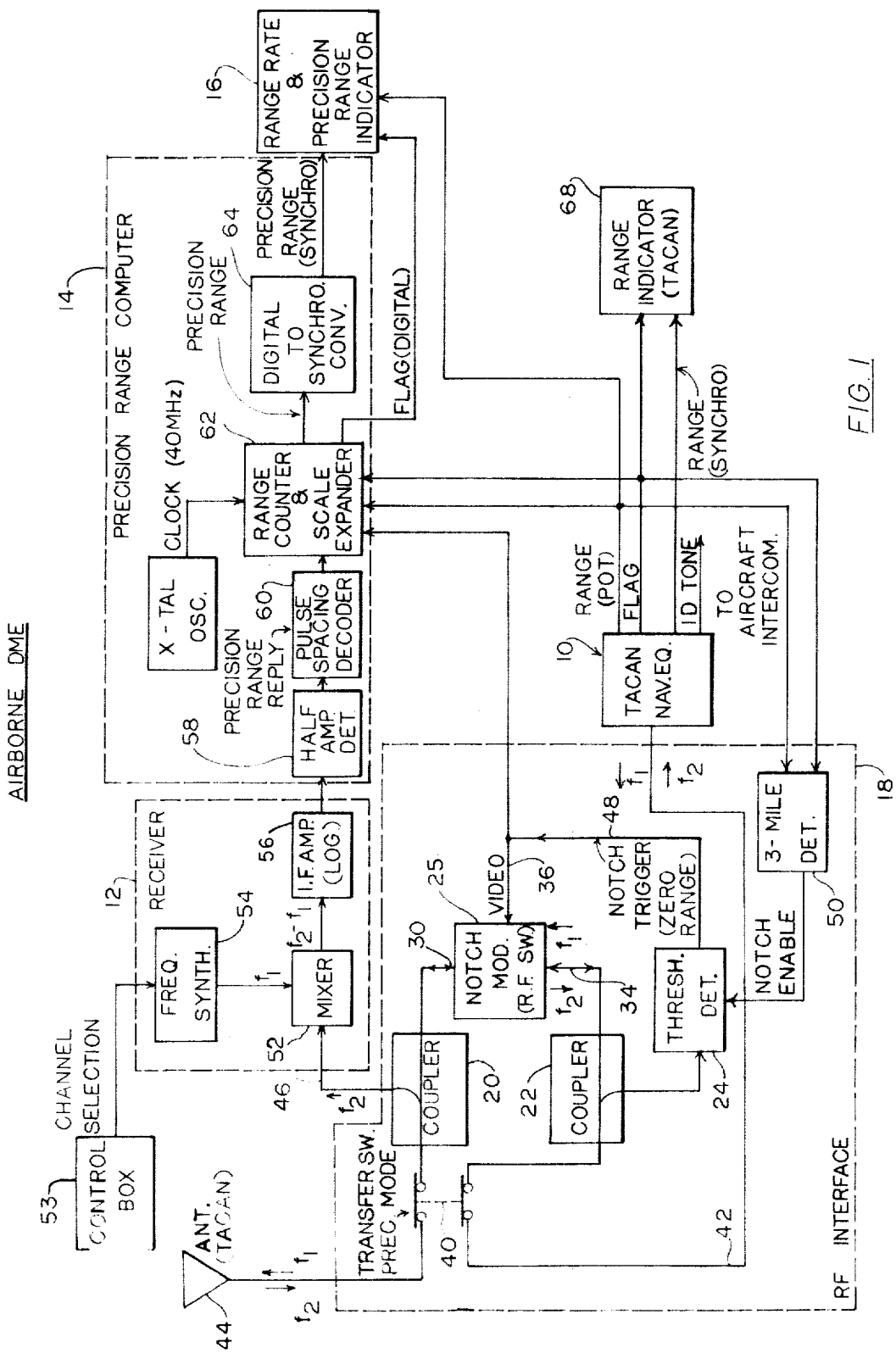
FIG. 1 is a block diagram of airborne distance measuring equipment arranged according to the invention.

Referring now to the drawings wherein like reference characters designate like or corresponding parts throughout, there is illustrated in FIG. 1, an airborne distance measuring equipment comprising a conventional well known Tacan navigation device, generally designated as reference numeral 10, which generates interrogation pulses and establishes the pulse response rate. These interrogation pulses have a leading edge E and a standard Gaussian shape as clearly indicated in FIG. 4. The equipment further includes, according to the invention, precision distance measuring components comprising a radio frequency signal receiver 12, a precision range computer 14, a precision range indicator 16 and a radio frequency interface 18.

Figure 3:
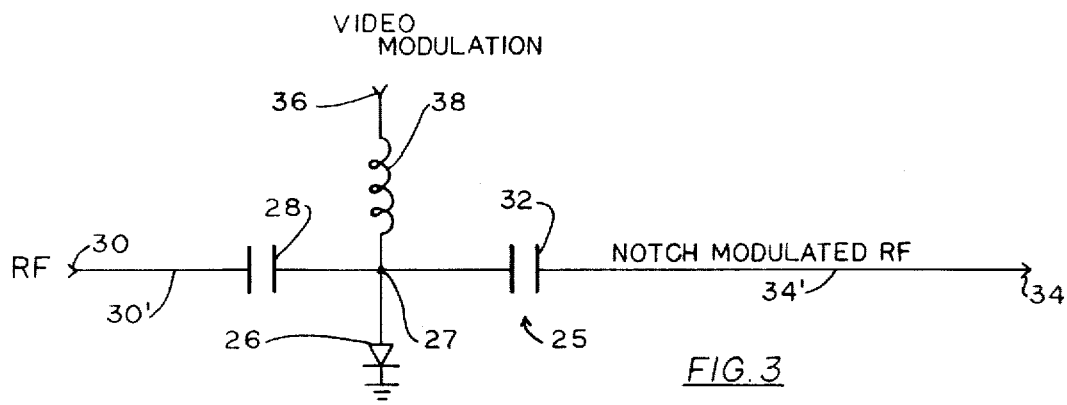
FIG. 3 is a schematic diagram of a modulator for producing a notch pulse.

The interface component 18 includes a pair of directional couplers 20, 22. The directional coupler 20 acts as a duplexer providing a two-way path for interrogations from and replies to the Tacan device 10. The interrogations are transmitted at an RF frequency $f_1$ and the replies are received at a different frequency $f_2$. The other directional coupler 22 couples some of the Tacan transmitted power (interrogation pulses) into a threshold detector 24 which produces a trigger to a notch modulator 25. The notch modulator 25 (see FIG. 3) is an RF switch employing a pin diode 26 connected between a junction point 27 and a ground. An isolating capacitor 28 is connected between an RF input 30 and the point 27. An isolating capacitor 32 is connected between a notch modulated output 34 and the junction point 27. A vidio modulation input 36 is connected to the junction point 27 via an inductor 38.

When the threshold detector 24 senses a leading edge E (see FIG. 4) of the first interrogation pulse $P_1$, the RF switch momentarily causes conduction of the diode 26 to ground. This momentarily interrupts the transmission path 30', 34' thereby creating a notch N in the first pulse $P_1$. During this time period which may be of the order of 0.35 microseconds the switch 25 acts as a short circuit, and energy is reflected back into the Tacan device 10.

A transfer switch 40 provides a direct path 42 between the Tacan device 10 and an antenna 44. It also provides a path 46 for return signals from a ground beacon (generally desiganted as reference numeral 100 FIG. 2) to the receiver 12. If desired, the transfer switch 40 may be operated to couple only the antenna 44 to the receiver 12 (via coupler 20), when the aircraft is receiving signals from the beacon station and is within 3 miles, at which time the range will only be indicated on the indicator 16 and not on the conventional Tacan indicator 68 (FIG. 1)

Figure 4:
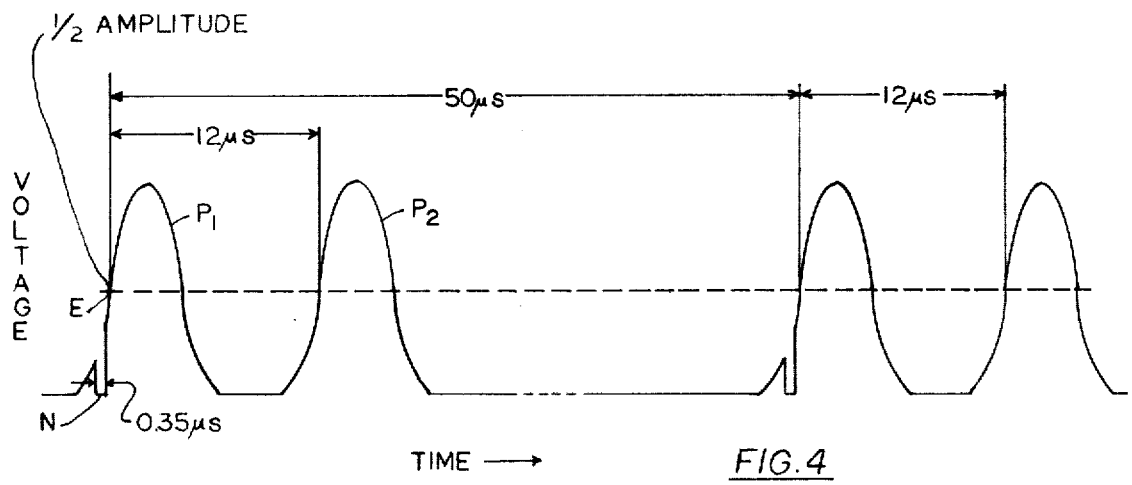
FIG. 4 is a graphic diagram of a notched waveform of signal emitted by the airborne equipment.

The threshold detector 24 detects a predetermined magnitude at the leading edge E of the first interrogation pulse $P_1$ (FIG. 4). An output 48 of the threshold detector 22 (the notch trigger) is used as a zero range timing reference in the range measurement.

Figure 2:
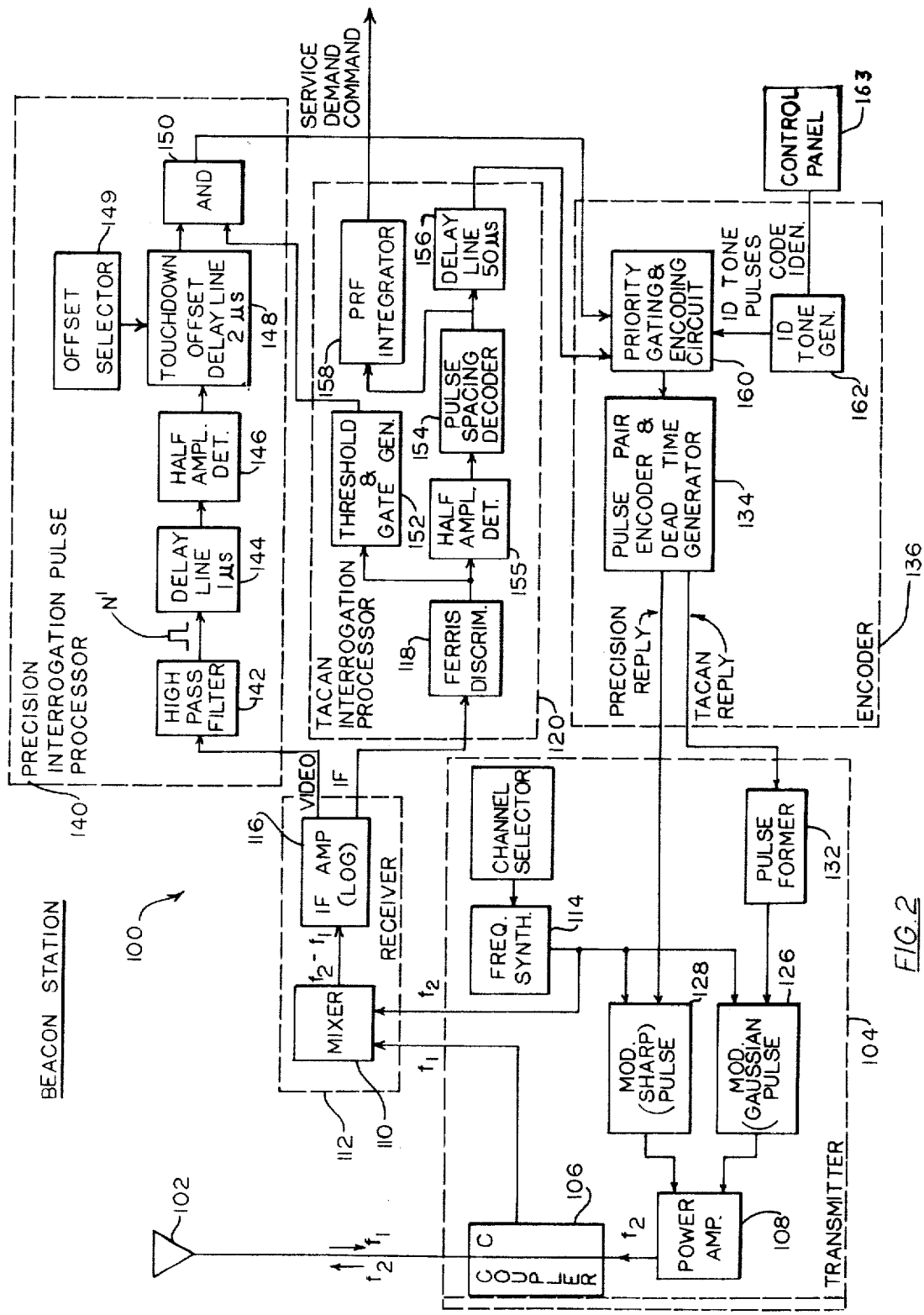
FIG. 2 is a block diagram of beacon equipment operated in conjunction with the airborne distance measuring equipment and arranged in accordance with the invention.

A 3-mile detector 50 determines when the aircraft is within a radius of 3 miles from the beacon 100 (FIG. 2). When the aircraft is outside this range of 3 miles from the beacon 100, the Tacan interrogation pulses do not contain any notch N, so no precision reply is made from the beacon 100. When the detector 50 determines that the aircraft is within 3 miles of the beacon 100, a notch control signal is generated by the detector 25. This action initiates the notching process which in turn solicits the precision replies from the beacon 100. The detector 24 may be a conventional DC voltage comparator which compares the DC range data from the Tacan device 10 with a fixed reference voltage.

The receiver 12 includes a mixer 52 which converts the beacon reply frequency $f_2$ to $f_2-f_1$ when a frequency synthesizer 54, actuated by a control box 53, provides a local oscillator signal of frequency $f_1$. The output from the mixer 32 is applied to an IF log amplifier 56. This is a conventional type of component employing cascaded amplifiers each of which has a gain characteristic different for small signals than that for large signals. The inflection point is different in each stage so that the total effect is to approximate a logarithmic curve by a series of linear segments. The IF signal $(f_2-f_1)$ is amplified in a logarithmic manner and is applied to a half amplitude detector 58 in the precision range computer 14.

Range measurements are made from the leading edge E of the pulse $P_1$(FIG. 4). Since the signal level is a function of the distance, a point is selected on the leading edge which provides the same timing reference regardless of signal level. It cannot be some absolute value but must be related to the pulse amplitude. A half amplitude value is selected because it has the sharpest rate of change and the triggering error is minimized. Since the detector 58 is preceded by the log amplifier 56, the half amplitude point of the linear pulse corresponds to a point on the log pulse some constant value below the amplitude regardless of the signal level. The detector 58 is fo conventional design employing a delay line, peak detector and voltage comparator.

A pulse spacing decoder 60 evaluates the intrapulse spacing of the range reply pair P'2, P'3 (FIG. 5) and generates an output pulse only when the spacing S is correct. The decoder 60 basically consists of a delay line whose delay time equals the intrapulse spacing (12 microseconds), and a coincidence detector.

A range counter 62 performs the precision range measurement and employs the RANGE and FLAG outputs of the Tacan device 10, which simplifies considerably the circuit of the range counter 62. The range counter includes a standard ripple counter clocked by a crystal controlled clock at a predetermined rate (40 MHz) so that very close range resolution (12 feet) is obtained. Scale expansion is simply obtained by shifting the decimal point of the decimal code used in the counter.

In order to simplify the circuit, the digital output of the range counter 62 is converted to analog form (synchro) in a digital to synchro converter 64 which is a standard commercially available component. The precision range indication and range rate data obtained from the converter 64 are displayed by the conventional indicator 16. The Tacan device 10 has its own standard range indicator 68.

The Tacan device 10 can operate independently of the precision range measuring components 12, 14, 16 and 18. However the latter depend on and utilize the transmitter portion of the Tacan device 10.

NOTCH MODULATION TECHNIQUE

A notch N (see FIG. 4) is imposed on the first pulse P1 of each pair of pulses P1, P2 of a wavetrain by the notch modulator 25 in the RF interface 18. when at a range of 40 nautical miles, the approaching pilot decides to home and land at a given air landing site, he switches to the Tacan and Guidance channel for that site. The Tacan device 10 will lock on in the normal manner and provide range information to the aircraft. When the pilot switches to the Guidance channel, he also selects the frequency for the precision DME channel. The pilot will notice no unusual indication until he reaches a point approximately 3 miles from the landing site. At that point, several things occur. The 3-mile range detector 50 in RF Interface 18 notes that the range is 3 miles or less and enables the Notch Modulator 25 via the threshold detector 24. When both the 3-mile range and Tacan power level threshold criteria are satisfied, the threshold detector 24 operates as a modulator driver and generates a trigger pulse which occurs at the leading edge E of the pulse P1. The notch modulator 25 then imposes the notch N on the pulse P1. The remainder of the first Tacan pulse P1 is then passed unmodified as is the second pulse of the pair P2. These pulses pass to the antenna 44 for radiation and pickup at the site of the beacon 100 where the signals received appear as shown in FIG. 4. The beacon 100 replies first with a pulse P'1 which is 1 or 2 microseconds after the notch. Then after a delay of 50 microseconds the equipment generates the standard pulse pair reply of P'2 P'3. The beacon reply pulses P'1, P'2,P'3 are received at the antenna 44 and passed to the mixer 52 in the receiver 12, of the airborne equipment. The FLAG signal output of the Tacan device 10 indicates acquisiton of a return signal from the beacon 100. The precision range measuring components use the RANGE output of the Tacan device 10 for range gating. The precision range measurement is obtained by measuring the time interval from the occurrence of the sharp notch N which is zero range reference to the fast rise time pulse P'1 (FIG. 5) which is followed by the conventional reply pulse pair P'2,P'3 having a slow rise time.

The beacon 100, shown in FIG. 2 employs an antenna 102 which both transmits and receives signals on frequencies $f_2$ and $f_1$ respectively. The antenna 102 may be a broadband monopole antenna, omnidirectional in the horizontal plane, and having a range of at least 40 miles to receive signals from an approaching aircraft carrying the airborne Tacan device 10.

A transmitter 104 may include a coupler 106 which serves as a duplexer in the beacon distance measuring equipment. The coupler 106 is connected to the antenna 102 to pass amplified return signals from a power amplifier 108. It also passes signals at frequency $f_1$ to a mixer 110 in a receiver 112.

The mixer 110 converts the interrogator frequency $f_1$ to an intermediate frequency $f_2$-$f_1$ when a local oscillator signal of correct frequency is received from a frequency synthesizer 114 in the transmitter 104. The mixer 110 drives a Log IF amplifier 116 of conventional design and includes a low noise preamplifier followed by several logging stages. The bandwidth is determined by an interstage filter which process the received notch pulse N. In the design of this amplifier logging accuracy is important to maintain system accuracy after encoding of the RF signals and in determining the half-voltage points of the DME pulses over the full dynamic range. Since the bandwidth of the logged intermediate frequency covers several operational frequency channels, the amplifier output is fed to a Ferris or center-tuned discriminator 118 in the Tacan interrogation processor 120 to allow detection of the proper frequency of the pulsed RF, since the Tacan channels may be spaced as close as 1 MHz. The Ferris discriminator 118 causes generation of a gate at a gate generator 152 to enable processing of the precision DME interrogation of proper frequency. The Ferris discriminator 118 determines if a notched interrogation pulse is at correct frequency. The frequency synthesizer 114 in the transmitter 104 is required to provide an accurate local oscillator frequency for mixing with the incoming notched Tacan pulses and to act as an exciter for the beacon transponder transmitter.

Figure 5:
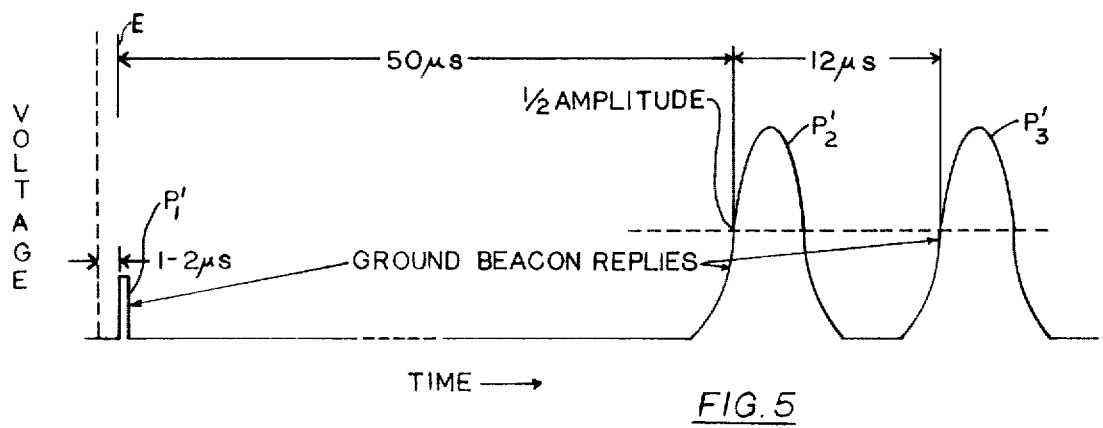
FIG. 5 is a graphic diagram of a return signal waveform emitted by the beacon equipment.

A modulator 126 generates Gaussian pulses such as pulses P'2,P'3 indicated in FIG. 5 and a modulator 128 generates the reply pulse P'1 which has fast rise time. The outputs of both of the modulators 126 and 128 are applied to the power amplifier 108 for radiation by the antenna 102.

The Gaussian pulse modulator 128 is driven by a pulse former 132 which receives a Tacan reply signal from a pulse pair encoder 134 in an encoder circuit 136. The encoder 134 also generates a precision reply signal which enables the modulator 128 to generate the sharp reply pulse P'1. In order to accomplish this, there is provided a precision signal interrogation processor 140.

The signal processor 140 includes a high pass filter 142 connected to the IF amplifier 116 in the receiver 112. The filter 142 blocks slower rise and fall time Tacan interrogation pulses and passes the sharp notch N which is used as a reference point in the precision distance measuring equipment. At the output of the filter 142 appears a single pulse N' with fast rise and fall times. The filter 142 is followed by a delay line 144 with a 1 microsecond delay time. The overall effect of the high pass filter 142 and the delay line 144 which is basically a low pass filter, is to provide bandpass filtering of 3 to 4 MHz wide centered around 3 MHz.

A half amplitude detector 146 is connected to the delay line 144. Since the range measurements are referenced to the leading edge E of the DME pulses and the signal level is a function of the distance a point is selected on the leading edge, a timing reference is provided which is independent of the signal level and consists of half of the value of the pulse amplitude because it has the sharpest rate of change and any error is thus minimal. Since the detector 146 is preceded by the log amplifier 116, the half amplitude point of the pulse corresponds to a point on the processed pulses some constant value below the peak amplitude regardless of the signal level. The half amplitude detector 146 consists basically of a 1.0 microsecond delay line, a peak detector and a voltage comparator.

The output of the detector 146 passes to a Touchdown Offset Delay line 148. This delay line is adjustable within a range of 2 microseconds selectable by an Offset Selector 149 in increments as small as possible to insure precision in range determination. the Delay Line 148 is preferably a digital delay line including a down-counter and decoder. The down-counter of the Delay Line 148 passes a pulse from amplifier 146 when the counter reaches zero. The decoder recognizes only the zero state of the down counter and serves to pass a pulse to an AND gate 150.

The AND gate 150 is also driven by a Threshold and Gate Generator 152 in the Tacan Interrogation Processor 120. The gate generator 152 provides the Precision Interrogation Processor 140 with channel selectivity. This is necessary because the detection of the fast notch pulse N requires a receiver circuit and a bandwidth of at least 10 MHz. This bandwidth covers several adjacent channels. The Tacan Interrogation Processor 120 is narrowband, i.e., one channel wide. Thus its frequency selectivity is employed to help the Precision Processor 140 recognize the notch N pusle of proper frequency. The gate is generated at the leading edge E of the first interrogation pulse and it is almost time coincident with the notch N. The Gate Generator 152 basically consists of a voltage comparator with a reference voltage for a threshold.

The Pulse Spacing Decoder 154 is preceded by a Half Amplitude detector 155. This detector is similar in arrangement and function to the Half Amplitude Detector 146 described above. The detector 155 drives the Pulse Spacing Decoder 154 which operates to make sure that the range reply is made only to the properly encoded pulse pair. The decoder 154 consists of a 12 microsecond delay line and a coincidence detector. The output of the Decoder 154 is applied to a Delay Line 156 and PRF Integrator 158. The delay line 156 provides a delay of 50 microseconds to satisfy requirements of the Encoder 136.

The PRF Integrator 158 evaluates the interrogation rate and generates a Service Demand signal when the PRF rate satisfies the minimum requirement (20 pulses per second) which corresponds to a single Tacan interrogation. The PRF integrator has conventional design and includes an operational amplifier used as an integrator, and a threshold circuit which serves as a voltage comparator.

A gating and encoding circuit 160 is located in the Encoder 136. Transmission of range replies or ID tone is accomplished in accordance with the following established priorities which are listed in decreasing order of priority:

a. ID Tone
b. Range replies.

The circuit 160 consists of several AND gates which are interconnected to determine this priority. Prior to transmission, the precision range replies are encoded as pulse pairs P'1, P'2 having 1 microsecond intrapair spacing.

An ID Tone Generator 162 is connected to the circuit 160 and consists of an oscillator and timing circuits to generate dot and dash intervals at a predetermined frequency (1350 HZ) and which are transmitted in bursts of different duration to represent dots and dashes of the Morse code. Upon receiving these bursts, the airborne Tacan device 10 (FIG. 1) produces an audible tone of dots and dashes which is fed to the aircraft intercommunication equipment for the pilot to identify the landing site. Selection of the identification code is accomplished by switches at a Control Panel 163.

To summarize, the precise range measurement is obtained by creating a sharp notch N for zero range reference in the first pulse P1 of the interrogation pair P1, P2, and by replying with fast rise time pulse P'1 from the ground beacon. The present arrangement makes it possible to determine the distance between an airborne aircraft and a beacon with an accuracy of 90 feet ± 1 percent within a range of 3 miles. Heretofore the closest range measurements possible with conventional Tacan equipment has been about 600 feet in a 3-mile range. Although the invention has been described in connection with a fixed ground beacon, it will be understood that the beacon equipment can be a fixed ground beacon or may be carried by an aircraft, in which case the airborne DME will determine the range to the aircraft carrying the beacon equipment.

It should be understood that the foregoing relates to only a preferred embodiment of the invention, which have been by way of example only and that it is intended to cover all changes and modifications of the example of the invention herein chosen for the purposes of the disclosure, which do not constitute departures from the spirit and scope of the invention.

The Invention claimed is:

1. A system for measuring the distance between an aircraft and a beacon station comprising an airborne measuring equipment, said equipment comprising:
   antenna means for radiating wavetrains of a plurality of interrogation pulses from said aircraft to said beacon station and for picking up a plurality of reply pulses therefrom;
   distance measuring apparatus in circuit with said antenna means, comprising:
      a transmitting means for generating said interrogation pulses, and
      a first receiving means for receiving said reply pulses and converting the same into data representing the approximate distance between said aircraft and said beacon station; and
   a high precision distance measuring apparatus comprising:
      a pulse modulation means in circuit with said transmitting means for imposing a notch on one pulse of each consecutive pair of said interrogation pulses;
      a second receiving means in circuit with said antenna means for receiving from said beacon station a special reply pulse having a fast rise time generated at said beacon station in response to reception there of said notched interrogation pulses; and
      computer means in circuit with said second receiving means for measuring the time interval between the instant of notching the first interrogation pulse and the instant of reception of said special reply pulse having a fast rise time, and for producing data corresponding to said time interval and representative with high precision of the distance between said aircraft and said beacon station.

2. A system as defined in claim 1, further comprising transfer switch means for deactivating said high precision distance measuring apparatus; and an indicator means in circuit with said first receiving means for indicating only said approximate distance between said aircraft and said beacon station.

3. A system as defined in claim 2, further comprising other indicator means in circuit with said computer means for indicating with high precision the distance between said aircraft and said beacon station.

4. A system as defined in claim 3, further comprising a distance detection means for determining when said aircraft is located within a predetermined short range from said beacon station, said distance detection means being connected in circuit with said pulse modulation means to enable the same to impose notches on alternate interrogation pulses.

5. A system as defined in claim 3, wherein said second receiving means comprises a logarithmic amplifier for producing a logarithmic pulse representative of time elapsing from the instant of imposition of the first notch on an interrogation pulse, and wherein said computer means comprises a half amplitude detector in circuit with said logarithmic amplifier to produce a timing reference pulse for use in determining elapsed time between the notch in the first interrogation and reception of said special reply pulse having fast rise time.

6. A system as defined in claim 1, further comprising said beacon station which comprises:
   a. a beacon antenna means for picking up said interrogation pulses and for radiating reply pulses;
   b. a beacon receiving means in circuit with said beacon antenna means for receiving the interrogation pulses;
   c. a beacon first pulse processing means in circuit with said beacon receiving means to detect the notches in said interrogation pulses; and
   d. a reply pulse generating means in circuit with said beacon antenna means and said beacon first pulse processing means for generating said special reply pulse having fast rise time in response to receipt of the notched interrogation pulses and for radiating the same to said aircraft.

7. A system as defined in claim 6, wherein said beacon station further comprises:
   a. a beacon second pulse processing means in circuit with said beacon receiving means to measure the time interval between received pairs of interrogation pulses; and
   b. a beacon reply pulse generating means in circuit with said beacon second pulse processing means and said beacon antenna means for generating a train of said reply pulses in response to reception of said interrogation pulses and for radiating the saem to said aircraft.

8. A system as defined in claim 7, wherein said beacon second pulse processing means comprises a center tuned discriminator to determine that the received interrogation pulses have a particular frequency assigned to said beacon station.

9. A system as defined in claim 7, comprising encoding means in circuit with said beacon first and said beacon second pulse processing means for separately generating pulses responsive to detection of the interrogation pulses and of the notches in the interrogation pulses.

10. A system as defined in claim 9, further comprising other transmitting means comprising:
   a. a first other pulse modulation means for generating a train of reply pulses responsive to reception of said interrogation pulses at the beacon station;
   b. a second other pulse modulation means for generating said special reply pulse having fast rise time responsive to detection of a notches in interrogation pulses received at the beacon station; and
   c. circuit means interconnecting said first and second other pulse modulation means and said other antenna means for radiating said train of reply pulses and said special reply pulse to the aircraft.

11. A system as defined in claim 6 wherein said beacon receiving means comprises a mixer for generating pulses at intermediate frequency in response to reception of said interrogation pulses; and a beacon logarithmic amplifier for producing logarithmic pulses at said intermediate frequency, said beacon first and said beacon second pulse processing means being connected to said beacon logarithmic amplifier for separately processing logarithmic pulses corresponding to the notches in the interrogation pulses and other logarithmic pulses corresponding to the interrogation pulses per se.

* * * * *